(12) United States Patent
Sohn et al.

(10) Patent No.: US 9,725,592 B2
(45) Date of Patent: Aug. 8, 2017

(54) COMPONENTS FOR VEHICLES, ELECTRIC/ELECTRONIC PRODUCTS, HOME APPLIANCES, OFFICE EQUIPMENTS OR HOUSEHOLD ITEMS

(71) Applicant: SK CHEMICALS CO., LTD., Gyeonggi-do (KR)

(72) Inventors: Dong-Cheol Sohn, Gyeonggi-do (KR); Tae-Woong Lee, Gyeonggi-do (KR); Jong-Wook Shin, Gyeonggi-do (KR)

(73) Assignee: SK CHEMICALS CO., LTD. (KR)

( * ) Notice: Subject to any disclaimer, the term of this patent is extended or adjusted under 35 U.S.C. 154(b) by 0 days.

(21) Appl. No.: 14/901,281

(22) PCT Filed: Jun. 23, 2014

(86) PCT No.: PCT/KR2014/005526
§ 371 (c)(1),
(2) Date: Dec. 28, 2015

(87) PCT Pub. No.: WO2014/208958
PCT Pub. Date: Dec. 31, 2014

(65) Prior Publication Data
US 2016/0369092 A1  Dec. 22, 2016

(30) Foreign Application Priority Data
Jun. 28, 2013 (KR) ........................ 10-2013-0075872

(51) Int. Cl.
*C08L 67/02* (2006.01)
*C08L 55/02* (2006.01)
*C08L 53/00* (2006.01)
*C08L 69/00* (2006.01)
*C08L 53/02* (2006.01)

(52) U.S. Cl.
CPC ............ *C08L 67/02* (2013.01); *C08L 53/025* (2013.01); *C08L 55/02* (2013.01); *C08L 69/00* (2013.01); *C08L 2201/08* (2013.01); *C08L 2205/03* (2013.01); *C08L 2205/035* (2013.01)

(58) Field of Classification Search
CPC ...... C08L 67/02; C08L 69/00; C08L 2201/08; C08L 2205/03; C08L 2205/035; C08L 55/02; C08L 53/025
USPC ....................................................... 524/504
See application file for complete search history.

(56) References Cited

U.S. PATENT DOCUMENTS

| 2012/0128984 A1 | 5/2012 | Kawabata |
| 2012/0177854 A1* | 7/2012 | Lee ...................... C08G 63/672 428/35.7 |

FOREIGN PATENT DOCUMENTS

| KR | 10-2011-0028696 A | | 3/2011 | |
| KR | 1020110028696 A | * | 3/2011 | ........... C08G 63/672 |
| KR | 10-2012-0075085 A | | 7/2012 | |
| KR | 1020120075085 A | * | 7/2012 | .............. C08L 67/00 |
| KR | 10-2013-0067516 A | | 6/2013 | |

OTHER PUBLICATIONS

Yu Ren et al. "Glass fiber reinforced, bio-based poly(trimethylene terephthalate) for extruded articles: compounding and processing study", DuPont Performance Polymers, 2012, pp. 1-5.*
International Search Report prepared by the Korean International Property Office on Oct. 1, 2014, for International Application No. PCT/KR2014/005526.
Ren et al., Glass fiber reinforced, bio-based poly(trimethylene terephthalate) for extruded articles: compounding and processing study, Dupont Performance Polymers, 2012.

* cited by examiner

*Primary Examiner* — Michael M Bernshteyn
(74) *Attorney, Agent, or Firm* — Sheridan Ross. P.C.

(57) ABSTRACT

Provided are components for vehicles, electric/electronic products, home appliances, office equipments or household items, which are manufactured using a high heat resistant polymer resin composition capable of providing an environmentally friendly biomass-containing synthetic resin which exhibits improved chemical resistance. Provided are components for vehicles, electric/electronic products, home appliances, office equipments or household items, which are manufactured using a high heat resistant polymer resin composition having excellent chemical resistance, the composition including a polyester copolymer containing a residue of a dicarboxylic acid component containing terephthalic acid and a residue of a diol component containing dianhydrohexitol; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and polytrimethylene terephthalate.

21 Claims, No Drawings

COMPONENTS FOR VEHICLES, ELECTRIC/ELECTRONIC PRODUCTS, HOME APPLIANCES, OFFICE EQUIPMENTS OR HOUSEHOLD ITEMS

CROSS REFERENCE TO RELATED APPLICATIONS

This application is a national stage application under 35 U.S.C. 371 and claims the benefit of PCT Application No. PCT/KR2014/005526 having an international filing date of Jun. 23, 2014, which designated the United States, which PCT application claimed the benefit of Korean Patent Application No. 10-2013-0075872 filed Jun. 28, 2013, the disclosures of each of which are incorporated herein by reference.

TECHNICAL FIELD

The present invention relates to components for vehicles, electric/electronic products, home appliances, office equipments or household items, which are manufactured using a high heat resistant polymer resin composition capable of providing an environmentally friendly biomass-containing synthetic resin which exhibits improved chemical resistance.

BACKGROUND OF ART

Polyester resins are widely used in reinforced plastics, paints, films, and resins for molding, and also used as fabric materials to produce clothing due to characteristics of superior heat resistance, mechanical strength and elastic strength.

Recently, use of polyester resins in the fields of interior building materials or molded sign panels is increasing because of the characteristic physical properties. However, polyester resins have lower heat resistance than other polymer materials, for example, acrylic materials or polycarbonate materials, and thus there is a problem that polyester resins are not suitable for exterior building materials under severe change of seasonal temperature.

Meanwhile, polycarbonate resins are used in a variety of fields of building materials and housings for electronic products, packaging materials, cases, boxes, and interior/exterior building materials due to excellent properties of impact resistance or heat resistance. Demands for such polycarbonate resins are increasing owing to excellent mechanical property, but there are problems that discoloration or cracking of polycarbonate products may occur by frequently used cleaners, cosmetics for women, or hand sanitizers for infants, or deterioration of polycarbonate products may occur by various household chemicals.

There have been many attempts to solve the problems of the polyester resins or polycarbonate resins, and studies on blending of the polyester resins with the polycarbonate resins have been conducted.

Further, a technique of improving impact resistance and heat resistance by blending an acrylonitrile-butadiene-styrene-based graft copolymer (ABS) with a polycarbonate resin has been developed, but there is a limitation in that the product is not an environmentally friendly biomass product. Meanwhile, since the polyester resin and the polycarbonate resin are different from each other in terms of melting point and molecular structure, it is difficult to improve heat resistance only by simple blending thereof. Further, many methods have been used in order to improve chemical resistance while maintaining mechanical property of polycarbonate, in particular, heat resistance, but there were problems that the improvement of chemical resistance is not enough to be practically applied to industries, and appearance of a resin product is deteriorated. Furthermore, a method of further blending with one or more materials has been attempted in order to improve heat resistance and chemical resistance at the same time, but it was difficult to obtain satisfactory chemical resistance.

Meanwhile, an engineering plastic, of which use is rapidly growing, is ABS (acrylonitrile-butadiene-styrene) or PC/ABS (polycarbonate/ABS). By applying excellent heat resistance, impact resistance, and self-extinguishing property of PC and processability and economic advantages of ABS, PC/ABS has been developed. In terms of chemical resistance, however, PC/ABS is susceptible to most chemicals, such as aromatic hydrocarbons, acetone, and alcohols. When PC/ABS is directly exposed to these chemicals for a long period of time, its discoloration, swelling, and cracking occur to deteriorate the value of the product. Therefore, many studies have been conducted to prepare a resin composition having superior chemical resistance to the conventional heat resistant ABS or PC/ABS. For example, it was reported that polyolefin-based resins having excellent chemical resistance are mixed and used in order to improve chemical resistance of ABS. However, there are problems that a block copolymer must be used as a compatibilizer in order to improve compatibility of incompatible materials, and phase separation occurs when practically applied, leading to a rapid reduction in mechanical properties.

DETAILED DESCRIPTION OF THE INVENTION

Technical Problem

The present invention is intended to provide components for vehicles, electric/electronic products, home appliances, office equipments or household items, which are manufactured using a high heat resistant polymer resin composition capable of providing an environmentally friendly biomass-containing synthetic resin which exhibits improved chemical resistance while exhibiting excellent impact resistance and heat resistance.

Technical Solution

The present invention provides components for vehicles, electric/electronic products, home appliances, office equipments or household items, which are manufactured using a high heat resistant polymer resin composition having excellent chemical resistance, the composition including a polyester copolymer containing a residue of a dicarboxylic acid component containing terephthalic acid and a residue of a diol component containing dianhydrohexitol; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and polytrimethylene terephthalate.

Further, the polymer resin composition may have 0.5 to 20% of percent loss in tensile strength, which is represented by the following Equation 1:

Percent loss in tensile strength (%)=[(tensile strength before test−tensile strength after test)/tensile strength before test]×100  [Equation 1]

Further, the polymer resin composition may include 5 to 90% by weight of the polyester copolymer, and 1 to 50% by weight of one or more copolymers selected from the group consisting of the unsaturated nitrile-diene-based rubber-aromatic vinyl graft copolymer, the alkylmethacrylate-diene-based rubber-aromatic vinyl graft copolymer, and the alkylmethacrylate-silicone/alkylacrylate graft copolymer.

Further, the polymer resin composition may further include 5 to 90% by weight of polycarbonate.

Furthermore, the polymer resin composition may include 1 to 40% by weight of polytrimethylene terephthalate.

Meanwhile, the polymer resin composition may further include 1 to 20% by weight of a styrene-ethylene-butylene-styrene block copolymer.

Further, the polyester copolymer may have a weight average molecular weight of 10,000 to 100,000 and a glass transition temperature of 0 to 200° C.

Further, in the polyester copolymer, the dicarboxylic acid component may further include one or more selected from the group consisting of aromatic dicarboxylic acids having 8 to 20 carbon atoms and aliphatic dicarboxylic acids having 4 to 20 carbon atoms.

Further, in the polyester copolymer, the dianhydrohexitol may be isosorbide.

Further, in the polyester copolymer, the content of dianhydrohexitol may be 5 to 60 mol %, based on the total content of the diol component.

Further, in the polyester copolymer, the diol component may further include one or more selected from the group consisting of compounds represented by the following Chemical Formulae 1, 2, and 3:

[Chemical Formula 1]

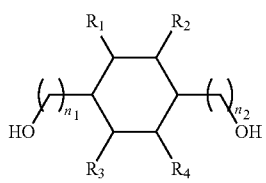

wherein $R_1$, $R_2$, $R_3$ and $R_4$ are each independently hydrogen or a substituted or unsubstituted alkyl group having 1 to 5 carbon atoms, and $n_1$ and $n_2$ are each independently an integer of 0 to 3;

[Chemical Formula 2]

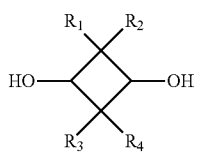

wherein $R_1$, $R_2$, $R_3$ and $R_4$ are each independently hydrogen or a substituted or unsubstituted alkyl group having 1 to 5 carbon atoms;

[Chemical Formula 3]

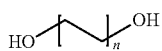

wherein n is an integer of 1 to 7.

Meanwhile, in the polyester copolymer, the diol component may further include 1,4-cyclohexanediol and ethylene glycol.

Further, the unsaturated nitrile-diene-based rubber-aromatic vinyl graft copolymer may be a core-shell rubber, in which its average particle size may be 0.1 to 5 μm, its graft ratio may be 5 to 90%, a glass transition temperature of the core may be −20° C. or lower, and a glass transition temperature of the shell may be 20° C. or higher.

Further, in the unsaturated nitrile-diene-based rubber-aromatic vinyl graft copolymer, the unsaturated nitrile may be one or more selected from the group consisting of acrylonitrile, methacrylonitrile, ethacrylonitrile, phenylacrylonitrile, and α-chloroacrylonitrile.

Further, in the graft copolymer, the diene-based rubber may be a butadiene-type rubber or an isoprene-type rubber.

Furthermore, in the graft copolymer, the aromatic vinyl may be one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

Further, the unsaturated nitrile-diene-based rubber-aromatic vinyl graft copolymer may be an acrylonitrile-butadiene-styrene graft copolymer.

Further, the alkylmethacrylate-diene-based rubber-aromatic vinyl graft copolymer may be a methyl methacrylate-butadiene-styrene graft copolymer.

Further, the alkylmethacrylate-silicone/alkylacrylate graft copolymer may be a methyl methacrylate-silicone/butylacrylate graft copolymer.

Furthermore, the polycarbonate may have a glass transition temperature of 50 to 200° C. and a weight average molecular weight of 10,000 to 200,000.

Further, the polytrimethylene terephthalate may have a weight average molecular weight of 10,000 to 150,000.

Further, the polymer resin composition may further include one or more selected from the group consisting of an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

Meanwhile, the polymer resin composition may include 10% by weight or less of one or more additives selected from the group consisting of an antioxidant, a lubricant, a light stabilizer, a light absorber, a transesterification inhibitor, and an anti-hydrolysis agent, based on the total weight of the composition.

Advantageous Effects

According to the present invention, provided are components for vehicles, electric/electronic products, home appliances, office equipments or household items, which are manufactured using a high heat resistant polymer resin composition capable of providing an environmentally friendly biomass-containing synthetic resin which exhibits improved chemical resistance while exhibiting excellent impact resistance and heat resistance.

DETAILED DESCRIPTION OF THE EMBODIMENTS

While the present invention is susceptible to various modifications and alternative forms, specific exemplary embodiments thereof are herein described in detail. It should be understood, however, that the description thereof is not intended to limit the present invention to the particular forms disclosed, but, on the contrary, the present intention is to cover all modifications, equivalents, and/or alternatives that fall within the spirit and scope of the present invention. In the present specification, if it is determined that a detailed description of related art unnecessarily makes the gist of the present invention unclear, the detailed description thereof will be omitted.

The present invention provides components for vehicles, electric/electronic products, home appliances, office equipments or household items, which are manufactured using a high heat resistant polymer resin composition having excellent chemical resistance, the composition including a polyester copolymer containing a residue of a dicarboxylic acid component containing terephthalic acid and a residue of a diol component containing dianhydrohexitol; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and polytrimethylene terephthalate.

Hereinafter, the polymer resin composition according to specific embodiments of the present invention will be described in more detail.

According to an embodiment of the present invention, provided is components for vehicles, electric/electronic products, home appliances, office equipments or household items, which are manufactured using a high heat resistant polymer resin composition having excellent chemical resistance, the composition including a polyester copolymer containing a residue of a dicarboxylic acid component containing terephthalic acid and a residue of a diol component containing dianhydrohexitol; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and polytrimethylene terephthalate.

Conventionally, a technique of improving impact resistance and heat resistance by blending an acrylonitrile-butadiene-styrene graft copolymer (ABS) with a polycarbonate resin has been developed, but there is a limitation in that the product has poor chemical resistance or resistance to environmental stress cracking and is not an environment-friendly biomass product.

Accordingly, the present inventors have studied a high heat resistant resin composition being environmentally friendly and having improved chemical resistance or resistance to environmental stress cracking, and they found that a polymer resin composition including a particular polyester copolymer; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and polytrimethylene terephthalate exhibits physical properties of high heat resistance and improved chemical resistance or resistance to environmental stress cracking, thereby completing the present invention.

Meanwhile, the percent loss in tensile strength may be measured by the following method.

The pellets prepared by uniformly performing kneading extrusion of the polymer resin composition according to the present invention are injected at an injection temperature of 250° C. under the same conditions, and then the injected tensile strength samples are adjusted under conditions of 23±2° C. and a relative humidity of 50±5% for 24 hours. An experimental fixture for a chemical resistance test is manufactured to have a critical stress of 2.2%, and the sample is fixed in the experimental fixture. A blend of aromatic/aliphatic chemicals or a UV blocker is applied to the sample for 1 minute, and then left at 23±2° C. for 72 hrs. Thereafter, tensile strength before/after the test is measured to determine percent loss in tensile strength (%), which is compared to evaluate superiority of chemical resistance.

The blend of aromatic/aliphatic chemicals includes 10 to 90% by weight of ethanol, and further includes one or more selected from the group consisting of aliphatic and aromatic alcohols, aliphatic and aromatic esters, aromatic aldehyde, unsaturated hydrocarbon, saturated hydrocarbon, aliphatic amine, aliphatic diamine, and terpene as a subcomponent.

Meanwhile, the percent loss in tensile strength is expressed as %, and calculated by the following Equation 1:

Percent loss in tensile strength (%)=[(tensile strength before test−tensile strength after test)/tensile strength before test]×100   [Equation 1]

As described above, as the percent loss in tensile strength (%) after test is lower, the polymer resin composition has more excellent chemical resistance.

Meanwhile, the polymer resin composition may be used in the components for vehicles, electric/electronic products, home appliances, office equipments or household items. Specifically, for vehicles, the polymer resin composition may be used in instrument panel module-related plastic components, door trim-related plastic components, lamp housing-related components, wheel cover-related components, vehicle interior/exterior garnish-related components, door handle lever components, etc. and for electric/electronic products, it may be used in cell phone housing components, electronic dictionary housing components, CD player components, MP3-related components, electronic calculator housing components, etc.

For home appliances, the polymer resin composition may be used in refrigerator interior-related components, washing machine-related plastic components, air conditioner housing components, vacuum housing components, mixer housing components, bidet-related components, etc., and for office equipments, it may be used in multifunction printer interior/exterior-related components, printer interior/exterior-related components, fax interior/exterior-related components, scanner interior/exterior-related components, etc. For household items, the polymer resin composition may be used in kitchen appliance-related plastic components, bathroom ware-related plastic components, etc.

The polymer resin composition may be prepared by using a method and an apparatus generally used in the preparation of a blend or mixture of polymer resins without limitation. For example, the polyester copolymer; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and polytrimethylene terephthalate are injected to a general blender, mixer, or tumbler, and blended with each other by a twin-screw kneading extruder so as to provide the polymer resin composition. In the preparation process of the polymer resin composition, respective resins sufficiently dried are preferably used.

Moreover, the polymer resin composition includes polytrimethylene terephthalate, thereby improving chemical resistance or resistance to environmental stress cracking.

The polymer resin composition may include 5 to 90% by weight of the polyester copolymer, and 1 to 50% by weight of one or more copolymers selected from the group consisting of the unsaturated nitrile-diene-based rubber-aromatic vinyl graft copolymer, the alkylmethacrylate-diene-based rubber-aromatic vinyl graft copolymer, and the alkylmethacrylate-silicone/alkylacrylate graft copolymer.

Further, the polymer resin composition may further include 5 to 90% by weight of polycarbonate.

Further, the polymer resin composition may further include 1 to 40% by weight of polytrimethylene terephthalate.

Further, when the polymer resin composition further includes 1 to 20% by weight of the styrene-ethylene-butylene-styrene block copolymer, chemical resistance or resistance to environmental stress cracking of the polymer resin composition may be further improved.

Further, the 'residue' means a moiety or unit, which is contained in the product of a chemical reaction of a specific compound and is derived from the specific compound. For example, each of the 'residue' of the dicarboxylic acid component and 'residue' of the diol component means either a moiety derived from the dicarboxylic acid component or the diol component of polyester formed by esterification or polycondensation.

The 'dicarboxylic acid component' means that it includes dicarboxylic acid such as terephthalic acid, an alkyl ester thereof (e.g., a lower alkyl ester having 1 to 4 carbon atoms such as monomethyl, monoethyl, dimethyl, diethyl or dibutyl ester), and/or an acid anhydride thereof, and may react with the diol component to form a dicarboxylic acid moiety such as terephthaloyl moiety.

The dicarboxylic acid component used in the polyester synthesis contains terephthalic acid, thereby improving physical properties of the polyester resin to be prepared, such as heat resistance, chemical resistance or weather resistance (e.g., prevention of a reduction in the molecular weight or yellowing due to UV).

The dicarboxylic acid component may further include an aromatic dicarboxylic acid component, an aliphatic dicarboxylic acid component, or a mixture thereof as other dicarboxylic acid component. In this regard, 'other dicarboxylic acid component' means a component excluding terephthalic acid, among the dicarboxylic acid components.

Meanwhile, in the polyester copolymer, the dicarboxylic acid component may further include one or more selected from the group consisting of aromatic dicarboxylic acids having 8 to 20 carbon atoms and aliphatic dicarboxylic acids having 4 to 20 carbon atoms.

The aromatic dicarboxylic acid component may be aromatic dicarboxylic acid having 8 to 20 carbon atoms, preferably 8 to 14 carbon atoms, or a mixture thereof. Examples of the aromatic dicarboxylic acid may include isophthalic acid, naphthalene dicarboxylic acid such as 2,6-naphthalene dicarboxylic acid, diphenyl dicarboxylic acid, 4,4'-stilbene dicarboxylic acid, 2,5-furan dicarboxylic acid, 2,5-thiophene dicarboxylic acid, but specific examples of the aromatic dicarboxylic acid are not limited thereto.

The aliphatic dicarboxylic acid component may be aliphatic dicarboxylic acid component having 4 to 20 carbon atoms, preferably 4 to 12 carbon atoms, or a mixture thereof. Examples of the aliphatic dicarboxylic acid may include cyclohexanedicarboxylic acid such as 1,4-cyclohexanedicarboxylic acid or 1,3-cyclohexanedicarboxylic acid, a linear, branched, or cyclic aliphatic dicarboxylic acid component such as phthalic acid, sebacic acid, succinic acid, isodecylsuccinic acid, maleic acid, fumaric acid, adipic acid, glutaric acid, or azelaic acid, but specific examples of the aliphatic dicarboxylic acid are not limited thereto.

Meanwhile, the dicarboxylic acid component may include 50 to 100 mol %, preferably 70 to 100 mol % of terephthalic acid; and 0 to 50 mol %, preferably 0 to 30 mol % of one or more dicarboxylic acids selected from the group consisting of aromatic dicarboxylic acids and aliphatic dicarboxylic acids. If the content of terephthalic acid in the dicarboxylic acid component is too low or high, physical properties of the polyester resin, such as heat resistance, chemical resistance or weather resistance, may be deteriorated.

Meanwhile, the diol component used in the polyester synthesis may include 5 to 60 mol % of dianhydrohexitol, 5 to 80 mol % of cyclohexanedimethanol, and a residual amount of other diol compound.

The diol component preferably contains isosorbide (1,4:3,6-dianhydroglucitol) as dianhydrohexitol, thereby improving physical properties of chemical resistance as well as heat resistance of the polyester resin to be prepared. As the content of cyclohexanedimethanol (e.g., 1,2-cyclohexanedimethanol, 1,3-cyclohexanedimethanol or 1,4-cyclohexanedimethanol) is increased in the diol component, impact resistance of the polyester resin to be prepared may be greatly increased.

In addition, the diol component may further include other diol component, in addition to isosorbide and cyclohexanedimethanol. The 'other diol component' means a diol component excluding isosorbide and cyclohexanedimethanol, and for example, it may be aliphatic diol, aromatic diol, or a mixture thereof.

In the polyester copolymer, the diol component may further include one or more selected from the group consisting of compounds represented by Chemical Formulae 1, 2, and 3:

[Chemical Formula 1]

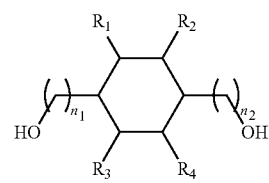

wherein $R_1$, $R_2$, $R_3$ and $R_4$ are each independently hydrogen or a substituted or unsubstituted alkyl group having 1 to 5 carbon atoms, and $n_1$ and $n_2$ are each independently an integer of 0 to 3;

[Chemical Formula 2]

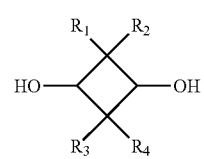

wherein $R_1$, $R_2$, $R_3$ and $R_4$ are each independently hydrogen or a substituted or unsubstituted alkyl group having 1 to 5 carbon atoms;

[Chemical Formula 3]

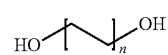

wherein n is an integer of 1 to 7.

As described above, the diol component of the polyester resin may include 5 to 60 mol % of dianhydrohexitol. If the content of dianhydrohexitol in the diol component is less than 5 mol %, heat resistance or chemical resistance of the polyester resin to be prepared will be insufficient, and melting viscosity property of the polyester resin may be not obtained. Further, if the content of dianhydrohexitol is more than 60 mol %, appearance of the polyester resin or product may be deteriorated or yellowing may occur.

Further, the polyester copolymer may have a weight average molecular weight of 10,000 to 100,000 and a glass transition temperature of 0 to 200° C.

Meanwhile, the polyester resin may be provided by a method of preparing the polyester resin including the steps of esterifying a diol component containing 5 to 60 mol % of isosorbide as dianhydrohexitol, 5 to 80 mol % of cyclohexanedimethanol, and a residual amount of other diol compound with a dicarboxylic acid component containing terephthalic acid; adding a phosphorus-based stabilizer at the time when the degree of esterification reaches at least 80%; and subjecting the esterification product to polycondensation.

According to the method of preparing the polyester resin, a catalyst including a zinc compound is used for the esterification reaction, a phosphorus-based stabilizer is added to the reaction solution at the end of the esterification reaction, for example, at the time when the degree of esterification reaches at least 80%, and the resulting esterification product is subjected to polycondensation, thereby providing a polyester resin that exhibits physical properties of high heat resistance, flame retardancy, and impact resistance, and has excellent appearance property, high transparency and excellent molding property.

Detailed descriptions of the dicarboxylic acid component containing terephthalic acid, cyclohexanedimethanol, isosorbide and other diol compound are the same as described above.

The esterification reaction between the dicarboxylic acid components and the diol components may be carried out at a pressure of 0 to 10.0 kg/cm$^2$ and a temperature of 150 to 300° C. The esterification reaction conditions may be appropriately varied depending on specific characteristics of the final polyester, the molar ratio between the dicarboxylic acid components and glycol, or processing conditions. Preferred exemplary conditions for the esterification reaction include a pressure of 0 to 5.0 kg/cm$^2$, more preferably 0.1 to 3.0 kg/cm$^2$; and a temperature of 200 to 270° C., more preferably 240 to 260° C.

The esterification reaction may be carried out in a batch or continuous manner. The respective raw materials may be separately added, but they are preferably added in the form of slurry by mixing the diol components with the dicarboxylic acid components. The slurry may be prepared by dissolving the diol components such as dianhydrohexitol in the form of a solid at room temperature in water or ethylene glycol, and then mixing the solution with the dicarboxylic acid components containing terephthalic acid. Alternatively, the slurry may be prepared by melting dianhydrohexitol at 60° C. or higher, and then mixing the molten dianhydrohexitol with the dicarboxylic acid components containing terephthalic acid and other diol component. Water may be further added to the slurry of the dicarboxylic acid components and the copolymerized diol components of dianhydrohexitol and ethylene glycol, thereby enhancing the flowability of the slurry.

The molar ratio between the dicarboxylic acid components and the diol components participating in the esterification reaction may be 1:1.05 to 1:3.0. If the molar ratio of dicarboxylic acid component:diol component is less than 1:1.05, the dicarboxylic acid components may remain unreacted after polymerization, causing poor transparency of the resin. On the contrary, if the molar ratio exceeds 1:3.0, the polymerization rate may be lowered or the productivity of the resin may be deteriorated.

The polycondensation reaction step of the esterification products may include the step of reacting the esterification products of the dicarboxylic acid component and the diol component at a temperature of 150 to 300° C. and a reduced pressure of 600 to 0.01 mmHg for 1 to 24 hours.

The polycondensation reaction may be carried out at a temperature of 150 to 300° C., preferably 200 to 290° C., and more preferably 260 to 280° C., and a reduced pressure of 600 to 0.01 mmHg, preferably 200 to 0.05 mmHg, and more preferably 100 to 0.1 mmHg. The reduced pressure condition of the polycondensation reaction enables the removal of glycol, which is a by-product of the polycondensation reaction, from the system. If the polycondensation reaction is carried out outside the reduced pressure range of 400 to 0.01 mmHg, removal of the by-product may be insufficient.

If the polycondensation reaction is carried out outside the temperature range of 150 to 300° C., that is, if the polycondensation reaction is carried out at a temperature of 150° C. or lower, glycol which is a by-product of the polycondensation reaction cannot be effectively removed from the system, and as a result, the intrinsic viscosity of the final reaction product may be lowered, which deteriorates the physical properties of the polyester resin, and if the reaction is carried out at a temperature of 300° C. or higher, there is a high possibility that yellowing may occur on appearance of the polyester resin. The polycondensation reaction may be carried out for a time necessary for the intrinsic viscosity of the final reaction product to reach an appropriate level, for example, for an average retention time of 1 to 24 hours.

Meanwhile, the method of preparing the polyester resin composition may further include the step of adding a polycondensation catalyst. The polycondensation catalyst may be added to the esterification or transesterification reaction product before initiation of the polycondensation reaction. Alternatively, the polycondensation catalyst may be added to a slurry mixture containing the diol components and the dicarboxylic acid components before or during the esterification reaction.

As the polycondensation catalyst, a titanium compound, a germanium compound, an antimony compound, an aluminum compound, a tin compound, or a mixture thereof may be used. Examples of the titanium compound and the germanium compound are the same as those described above.

Meanwhile, the polymer resin composition according to the present invention includes one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer.

The unsaturated nitrile-diene-based rubber-aromatic vinyl graft copolymer may be a core-shell rubber, in which its average particle size may be 0.01 to 5 μm, its graft ratio may be 5 to 90%, a glass transition temperature of the core may be −20° C. or lower, and a glass transition temperature of the shell may be 20° C. or higher.

The unsaturated nitrile-diene-based rubber-aromatic vinyl graft copolymer is a core-shell rubber prepared by an emulsion polymerization or bulk polymerization process, in which its average particle size may be 0.01 to 5 μm, its graft ratio may be 5 to 90%, a glass transition temperature of the core may be −20° C. or lower, and a glass transition temperature of the shell may be 20° C. or higher, and optionally, the shell may contain or not a functional group such as glycidyl methacrylate or maleic anhydride.

In the unsaturated nitrile-diene-based rubber-aromatic vinyl graft copolymer, the unsaturated nitrile may be one or more selected from the group consisting of acrylonitrile, methacrylonitrile, ethacrylonitrile, phenylacrylonitrile, and α-chloroacrylonitrile.

In the above graft copolymers, the diene-based rubber may be a butadiene-type rubber or an isoprene-type rubber.

Furthermore, in the above graft copolymers, the aromatic vinyl may be one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

Meanwhile, the core-shell rubbers may have optionally a morphology with monomodal distribution of an average particle size of 0.01 to 5 μm or a morphology with multimodal distribution of an average particle size of 0.01 to 5 μm.

Further, the alkylmethacrylate may be one or more selected from the group consisting of methyl methacrylate, ethyl methacrylate, propyl methacrylate, isopropyl methacrylate, and butyl methacrylate.

Preferably, the unsaturated nitrile-diene-based rubber-aromatic vinyl graft copolymer may be an acrylonitrile-butadiene-styrene graft copolymer, and the alkylmethacrylate-diene-based rubber-aromatic vinyl graft copolymer may be a methyl methacrylate-butadiene-styrene graft copolymer. Furthermore, the alkylmethacrylate-silicone/alkylacrylate graft copolymer may be a methyl methacrylate-silicone/butylacrylate graft copolymer.

Meanwhile, the polycarbonate may have a glass transition temperature of 50 to 200° C. and a weight average molecular weight of 10,000 to 200,000.

Further, the polytrimethylene terephthalate may have a weight average molecular weight of 10,000 to 150,000.

The polymer resin composition may further include one or more selected from the group consisting of an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

In this regard, the unsaturated nitrile-aromatic vinyl-glycidyl methacrylate-based compatibilizer may be included in an amount of 15% by weight or less, the unsaturated nitrile-aromatic vinyl-maleic anhydride-based compatibilizer in an amount of 15% by weight or less, the saturated ethylene-alkylacrylate-glycidyl methacrylate-based compatibilizer in an amount of 15% by weight or less, and the carbodiimide-based anti-hydrolysis agent in an amount of 10% by weight or less.

The alkylacrylate may be one or more selected from the group consisting of methyl acrylate, ethyl acrylate, propyl acrylate, isopropyl acrylate, butyl acrylate, hexyl acrylate, octyl acrylate and 2-ethylhexyl acrylate.

Further, the unsaturated nitrile-aromatic vinyl-glycidyl methacrylate-based compatibilizer may have a glass transition temperature of 20 to 200° C. and a weight average molecular weight of 200 to 300,000, and optionally, it may be replaced by aromatic vinyl-glycidyl methacrylate.

The unsaturated nitrile-aromatic vinyl-maleic anhydride-based compatibilizer may have a glass transition temperature of 20 to 200° C. and a weight average molecular weight of 200 to 300,000, and the saturated ethylene-alkylacrylate-glycidyl methacrylate-based compatibilizer may have a glass transition temperature of −150 to 200° C. and a weight average molecular weight of 200 to 300,000.

Further, the carbodiimide-based anti-hydrolysis agent may have a weight average molecular weight of 50 to 300,000 and may be represented by the following Chemical Formula 4 or Chemical Formula 5:

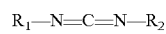    [Chemical Formula 4]

wherein $R_1$ and $R_2$ are each independently a hydrogen atom, an alkyl group having 1 to 20 carbon atoms or an aryl group having 6 to 36 carbon atoms;

[Chemical Formula 5]

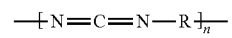

wherein R is an alkyl group having 1 to 20 carbon atoms or an aryl group having 6 to 36 carbon atoms, and n is an integer of 2 to 30,000 and represents an average degree of polymerization.

Meanwhile, the polymer resin composition may further include 10% by weight or less of one or more additives selected from the group consisting of an antioxidant, a lubricant, a light stabilizer, a light absorber, a transesterification inhibitor, and an anti-hydrolysis agent, based on the total weight of the resin composition which consists of a polyester copolymer including a residue of a dicarboxylic acid component containing terephthalic acid and a residue of a diol component containing dianhydrohexitol; and one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer.

Further, the hindered phenolic antioxidant may have a weight average molecular weight of 50 to 300,000.

The phosphite-based antioxidant may be selected from the group consisting of the following Chemical Formulae 6, 7, and 8:

[Chemical Formula 6]

wherein $R_1$ and $R_2$ are each independently a substituted or unsubstituted alkyl group having 1 to 40 carbon atoms or a substituted or unsubstituted aryl group having 6 to 40 carbon atoms;

[Chemical Formula 7]

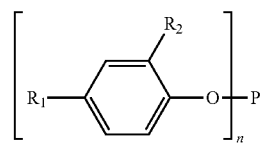

wherein R$_1$ and R$_2$ are each independently a substituted or unsubstituted alkyl group having 1 to 40 carbon atoms or a substituted or unsubstituted aryl group having 6 to 40 carbon atoms, and n is an integer of 1 or more and represents a substituted repeat unit;

[Chemical Formula 8]

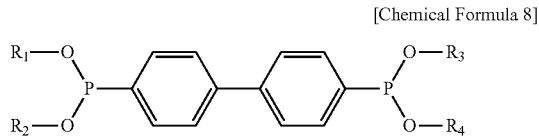

wherein R$_1$, R$_2$, R$_3$ and R$_4$ are each independently a substituted or unsubstituted alkyl group having 1 to 40 carbon atoms or a substituted or unsubstituted aryl group having 6 to 40 carbon atoms.

Meanwhile, the thioester-based antioxidant may be a compound represented by the following Chemical Formula 9 or Chemical Formula 10:

[Chemical Formula 9]

[Chemical Formula 10]

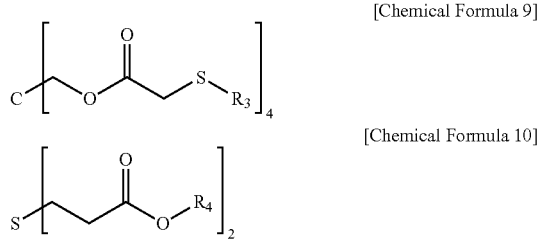

wherein R$_3$ and R$_4$ are each independently a substituted or unsubstituted alkyl group having 1 to 40 carbon atoms or a substituted or unsubstituted aryl group having 6 to 40 carbon atoms.

The lubricant may be one or more selected from the group consisting of a metallic stearate-based lubricant, an amide-based lubricant, a paraffin-based lubricant, and an ester-based lubricant.

The light stabilizer and light absorber may be a HALS-based light stabilizer, a benzotriazole-based light absorber, or a benzophenone-based light absorber.

Meanwhile, the transesterification inhibitor may be a phosphorus compound containing a minimal hydroxyl functional group and an alkylester functional group, or a hydrazine compound containing a unit represented by the following Chemical Formula 11:

[Chemical Formula 11]

Moreover, the polymer resin composition according to the present invention may further include an additive selected from the group consisting of a chain extender or a coupling agent containing a glycidyl methacrylate unit, an inorganic additive, a filler, a dye, a pigment, and a coloring agent.

Hereinafter, preferred examples of the present invention will be explained in more detail. However, these examples are provided for illustrative purposes and are not intended to limit the scope of the present invention.

Example 1

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 22% by weight of terephthalic acid-isosorbide-1,4-cyclohexanediol-ethylene glycol copolymer polyester (Tg: 110° C., weight average molecular weight: 55000), 10% by weight of acrylonitrile-butadiene-styrene graft copolymer, 10% by weight of polytrimethylene terephthalate, 3% by weight of styrene-ethylene-butylene-styrene block copolymer, and 55% by weight of polycarbonate, and extrusion was uniformly carried out using a twin-screw extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was a core-shell rubber-type graft ABS, HR-181 available from Kumho Petrochemical Co., the polytrimethylene terephthalate was PTT available from SK Chemicals, the styrene-ethylene-butylene-styrene block copolymer was H-1052 available from Asahi Kasei (Japan), the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was Irgafos 168 available from Clariant (Switzerland).

Example 2

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 24% by weight of terephthalic acid-isosorbide-1,4-cyclohexanediol-ethylene glycol copolymer polyester (Tg: 110° C., weight average molecular weight: 55000), 10% by weight of acrylonitrile-butadiene-styrene graft copolymer, 13% by weight of polytrimethylene terephthalate, 3% by weight of styrene-ethylene-butylene-styrene block copolymer, and 50% by weight of polycarbonate, and extrusion was uniformly carried out using a twin-screw extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was a core-shell rubber-type graft ABS, HR-181 available from Kumho Petrochemical Co., the polytrimethylene terephthalate was PTT available from SK Chemicals, the styrene-ethylene-butylene-styrene block copolymer was H-1052 available from Asahi Kasei (Japan), the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was S-9228 available from DOVER (USA).

Example 3

0.5% by weight of acrylonitrile-styrene-glycidyl methacrylate, 0.3% by weight of carbodiimide-based anti-hydrolysis agent, 0.2% by weight of a phenolic primary antioxidant, and 0.2% by weight of a phosphite-based secondary antioxidant were added, based on 100% by weight of a resin consisting of 14% by weight of terephthalic acid-isosorbide-1,4-cyclohexanediol-ethylene glycol copolymer polyester (Tg: 110° C., weight average molecular weight: 55000), 13% by weight of acrylonitrile-butadiene-styrene graft copolymer, 15% by weight of polytrimethylene terephthalate, 3% by weight of styrene-ethylene-butylene-styrene block copolymer, and 55% by weight of polycarbonate, and extrusion was uniformly carried out using a twin-screw extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was a core-shell rubber-type graft ABS, HR-181 available from Kumho Petrochemical Co., the polytrimethylene terephthalate was PTT available from SK Chemicals, the styrene-ethylene-butylene-styrene block copolymer was H-1052 available from Asahi Kasei (Japan), the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), the phosphite-based secondary antioxidant was S-9228 available from DOVER (USA), and the carbodiimide-based anti-hydrolysis agent was 9000 available from Raschig (Germany).

Example 4

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 10% by weight of terephthalic acid-isosorbide-1,4-cyclohexanediol-ethylene glycol copolymer polyester (Tg: 110° C., weight average molecular weight: 55000), 10% by weight of acrylonitrile-butadiene-styrene graft copolymer, 18% by weight of polytrimethylene terephthalate, 2% by weight of styrene-ethylene-butylene-styrene block copolymer, and 60% by weight of polycarbonate, and extrusion was uniformly carried out using a twin-screw extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was a core-shell rubber-type graft ABS, HR-181 available from Kumho Petrochemical Co., the polytrimethylene terephthalate was PTT available from SK Chemicals, the styrene-ethylene-butylene-styrene block copolymer was H-1052 available from Asahi Kasei (Japan), the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was Irgafos 168 available from Clariant (Switzerland).

Example 5

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 12% by weight of terephthalic acid-isosorbide-1,4-cyclohexanediol-ethylene glycol copolymer polyester (Tg: 110° C., weight average molecular weight: 55000), 10% by weight of acrylonitrile-butadiene-styrene graft copolymer, 10% by weight of polytrimethylene terephthalate, 3% by weight of styrene-ethylene-butylene-styrene block copolymer, and 65% by weight of polycarbonate, and extrusion was uniformly carried out using a twin-screw extruder (D: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was a core-shell rubber-type graft ABS, HR-181 available from Kumho Petrochemical Co., the polytrimethylene terephthalate was PTT available from SK Chemicals, the styrene-ethylene-butylene-styrene block copolymer was H-1052 available from Asahi Kasei (Japan), the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was Irgafos 168 available from Clariant (Switzerland).

COMPARATIVE EXAMPLES 1 TO 5

The conventional heat resistant ABS and PC/ABS products were used for comparison as follows.
Comparative Example 1: high-load (1.82 MPa) ABS product having heat resistance of 95° C.
Comparative Example 2: high-load (1.82 MPa) ABS product having heat resistance of 100° C.
Comparative Example 3: PC/ABS product having 50% polycarbonate content
Comparative Example 4: PC/ABS product having 60% polycarbonate content
Comparative Example 5: PC/ABS product having 70% polycarbonate content

EXPERIMENTAL EXAMPLE

Test of Physical Properties of Molded Articles Manufactured from Polymer Resin Composition The pellets prepared according to Examples 1 to 7 and Comparative Examples 1 to 5 were injected using an injector at an injection temperature of 250° C. under the same conditions, and then the injected test samples were adjusted under conditions of 23±2° C. and a relative humidity of 50±5%. Their mechanical properties were measured as follows. The test results are given in the following Tables 1 to 3.

Experimental Example 1

Test of Impact Strength

In accordance with ASTM D 256, test samples were prepared, and their impact strength was measured using an Izod impact tester (Toyoseiki).

Experimental Example 2

Test of Tensile Property

In accordance with ASTM D 638, test samples were prepared, and their tensile strength and elongation were measured using a universal testing machine (Zwick Roell Z010).

Experimental Example 3

Test of Flexural Property

In accordance with ASTM D 790, test samples were prepared, and their flexural strength and flexural modulus were measured using a universal testing machine (Zwick Roell Z010).

Experimental Example 4

Test of Heat Resistance

In accordance with ASTM D 648, test samples were prepared, and their heat resistance was measured using a heat resistance tester (HDT Tester, Toyoseiki).

Experimental Example 5

Test of Chemical Resistance of Molded Articles Manufactured from Polymer Resin Composition The pellets prepared according to Examples 1 to 7 and Comparative Examples 1 to 5 were injected using an injector at an injection temperature of 250° C. under the same conditions, and then the injected tensile strength samples were adjusted under conditions of 23±2° C. and a relative humidity of 50±5% for 24 hours. Evaluation was performed in accordance with the following method.

① An experimental fixture for a chemical resistance test was manufactured to have a critical stress of 2.2%, and a tensile test sample was fixed in the experimental fixture.

② A blend of aromatic/aliphatic chemicals or UV blocker was applied to the tensile test sample for 1 minute, and then left at 23±2° C. for 72 hrs.

③ After 72 hr at 23±2° C., tensile strength before/after the test was measured to determine percent loss in tensile strength (%), which is compared to evaluate superiority of chemical resistance.

$$\text{Percent loss in tensile strength}(\%) = [(\text{tensile strength before test} - \text{tensile strength after test})/\text{tensile strength before test}] \times 100 \quad \text{[Equation 1]}$$

wherein the blend of aromatic/aliphatic chemicals is characterized in that it includes 10 to 90% by weight of ethanol, and further includes one or more selected from the group consisting of the following subcomponents:

Subcomponents: aliphatic and aromatic alcohols, aliphatic and aromatic esters, aromatic aldehyde, unsaturated hydrocarbon, saturated hydrocarbon, aliphatic amine, aliphatic diamine, and terpene Further, as the UV blocker, a generally available product was selected.

TABLE 1

| Section | Unit | Example 1 | Example 2 | Example 3 | Example 4 | Example 5 |
|---|---|---|---|---|---|---|
| Izod impact strength (⅛") | J/m | 780 | 770 | 785 | 800 | 820 |
| Izod impact strength (¼") | J/m | 680 | 670 | 690 | 700 | 720 |
| Tensile strength | kg/cm² | 525 | 520 | 520 | 530 | 540 |
| Elongation | % | 125 | 115 | 120 | 130 | 125 |
| Heat resistance (1.82 MPa) | ° C. | 114 | 113 | 112 | 116 | 118 |
| Flexural strength | kg/cm² | 810 | 805 | 805 | 820 | 825 |
| Flexural modulus | kg/cm² | 21,000 | 21,000 | 21,000 | 21,500 | 22,000 |
| Chemical resistance | | | | Result | | |
| Percent loss in tensile strength (%) ① | | 3 | 3.5 | 3 | 4 | 3.5 |
| Percent loss in tensile strength (%) ② | | 5 | 5 | 4 | 5.5 | 4.5 |

* ①: Alcohol-based aromatic/aliphatic chemical blend
* ②: UV blocker

TABLE 2

| Section | Unit | Comparative Example 1 | Comparative Example 2 | Comparative Example 3 | Comparative Example 4 | Comparative Example 5 |
|---|---|---|---|---|---|---|
| Izod impact strength (⅛") | J/m | 250 | 240 | 600 | 550 | 650 |
| Izod impact strength (¼") | J/m | 210 | 180 | 500 | 450 | 550 |
| Tensile strength | kg/cm² | 470 | 475 | 440 | 550 | 550 |
| Elongation | % | 20 | 20 | 110 | 100 | 105 |
| Heat resistance (1.82 MPa) | ° C. | 95 | 100 | 100 | 105 | 110 |
| Flexural strength | kg/cm² | 630 | 650 | 600 | 780 | 780 |
| Flexural modulus | kg/cm | 21,000 | 21,500 | 17,000 | 22,000 | 22,000 |
| Chemical resistance | | | | Result | | |
| Percent loss in tensile strength (%) ① | | 57 | 55 | 50 | 35 | 52 |
| Percent loss in tensile strength (%) ② | | 62 | 60 | 53 | 60 | 55 |

* ①: Alcohol-based aromatic/aliphatic chemical blend
* ②: UV blocker

As shown in the above measurement results, Examples showed excellent heat resistance, impact resistance, and chemical resistance or resistance to environmental stress cracking, compared to Comparative Examples, indicating that the polymer resin composition according to the present invention exhibits physical properties of improved heat resistance or impact resistance, and also excellent resistance to environmental stress cracking, while the components thereof are environmentally friendly.

Although specific parts of the present invention have been described in detail, it will be apparent to those skilled in the art that these specific descriptions are provided for preferred embodiment and the scope of the present invention is not limited thereby. Therefore, the scope of the present invention should be defined only by the accompanying claims and equivalents thereof.

What is claimed is:

1. A molded article selected from the group consisting of components for vehicles, components for electric/electronic products, components for home appliances, components for office equipments and components for household items, including a heat resistant polymer resin composition having chemical resistance, the composition comprising:
   5% to 90% by weight of a polyester copolymer containing a residue of a dicarboxylic acid component containing terephthalic acid and a residue of a diol component containing dianhydrohexitol;
   1% to 50% by weight of one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and
   1% to 40% by weight of polytrimethylene terephthalate.

2. The molded article of claim 1, wherein the polymer resin composition has 0.5 to 20% of percent loss in tensile strength, which is represented by the following Equation 1:

Percent loss in tensile strength (%)=[(tensile strength before test−tensile strength after test)/tensile strength before test]×100  [Equation 1].

3. The molded article of claim 1, wherein the polymer resin composition further comprises 5 to 90% by weight of polycarbonate.

4. The molded article of claim 1, wherein the polymer resin composition further comprises 1 to 20% by weight of a styrene-ethylene-butylene-styrene block copolymer.

5. The molded article of claim 1, wherein the polyester copolymer has a weight average molecular weight of 10,000 to 100,000 and a glass transition temperature of 0 to 200° C.

6. The molded article of claim 1, wherein in the polyester copolymer, the dicarboxylic acid component further includes one or more selected from the group consisting of aromatic dicarboxylic acids having 8 to 20 carbon atoms and aliphatic dicarboxylic acids having 4 to 20 carbon atoms.

7. The molded article of claim 1, wherein in the polyester copolymer, the dianhydrohexitol is isosorbide.

8. The molded article of claim 1, wherein in the polyester copolymer, the content of dianhydrohexitol is 5 to 60 mol %, based on the total content of the diol component.

9. The molded article of claim 1, wherein in the polyester copolymer, the diol component further includes one or more selected from the group consisting of compounds represented by the following Chemical Formulae 1, 2, and 3:

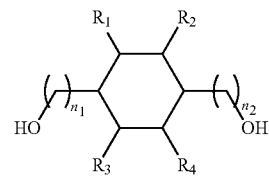

[Chemical Formula 1]

wherein $R_1$, $R_2$, $R_3$ and $R_4$ are each independently hydrogen or a substituted or unsubstituted alkyl group having 1 to 5 carbon atoms, and $n_1$ and $n_2$ are each independently an integer of 0 to 3;

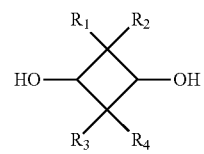

[Chemical Formula 2]

wherein $R_1$, $R_2$, $R_3$ and $R_4$ are each independently hydrogen or a substituted or unsubstituted alkyl group having 1 to 5 carbon atoms;

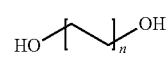

[Chemical Formula 3]

wherein n is an integer of 1 to 7.

10. The molded article of claim 1, wherein in the polyester copolymer, the diol component further includes 1,4-cyclohexanediol and ethylene glycol.

11. The molded article of claim 1, wherein the unsaturated nitrile-diene-based rubber-aromatic vinyl graft copolymer is a core-shell rubber, its average particle size is 0.1 to 5 μm, its graft ratio is 5 to 90%, a glass transition temperature of the core is −20° C. or lower, and a glass transition temperature of the shell is 20° C. or higher.

12. The molded article of claim 1, wherein in the unsaturated nitrile-diene-based rubber-aromatic vinyl graft copolymer, the unsaturated nitrile is one or more selected from the group consisting of acrylonitrile, methacrylonitrile, ethacrylonitrile, phenylacrylonitrile, and α-chloroacrylonitrile.

13. The molded article of claim 1, wherein in the graft copolymer, the diene-based rubber is a butadiene-type rubber or an isoprene-type rubber.

14. The molded article of claim 1, wherein in the graft copolymer, the aromatic vinyl is one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

15. The molded article of claim 1, wherein the unsaturated nitrile-diene-based rubber-aromatic vinyl graft copolymer is an acrylonitrile-butadiene-styrene graft copolymer.

16. The molded article of claim 1, wherein the alkylmethacrylate-diene-based rubber-aromatic vinyl graft copolymer is a methyl methacrylate-butadiene-styrene graft copolymer.

17. The molded article of claim 1, wherein the alkylmethacrylate-silicone/alkylacrylate graft copolymer is a methyl methacrylate-silicone/butylacrylate graft copolymer.

18. The molded article of claim 3, wherein the polycarbonate has a glass transition temperature of 50 to 200° C. and a weight average molecular weight of 10,000 to 200,000.

19. The molded article of claim 1, wherein the polytrimethylene terephthalate has a weight average molecular weight of 10,000 to 150,000.

20. The molded article of claim 1, wherein the polymer resin composition further comprises one or more selected from the group consisting of an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

21. The molded article of claim 1, wherein the polymer resin composition further comprises one or more additives selected from the group consisting of an antioxidant, a lubricant, a light stabilizer, a light absorber, a transesterification inhibitor, and an anti-hydrolysis agent.

* * * * *